United States Patent [19]

Takahashi et al.

[11] Patent Number: 4,944,195
[45] Date of Patent: * Jul. 31, 1990

[54] CONTROLLING TRANSMISSION

[75] Inventors: Takashi Takahashi, 26-18, Kamisoshigaya 1, Setagaya-ku, Tokyo; Kinichi Endo, Hachioji, both of Japan

[73] Assignee: Takashi Takahashi, Tokyo, Japan

[*] Notice: The portion of the term of this patent subsequent to Jul. 26, 2005 has been disclaimed.

[21] Appl. No.: 247,558

[22] Filed: Sep. 22, 1988

Related U.S. Application Data

[60] Continuation-in-part of Ser. No. 193,601, May 12, 1988, which is a division of Ser. No. 27,383, Mar. 18, 1987, Pat. No. 4,759,229.

[30] Foreign Application Priority Data

Sep. 12, 1986 [JP] Japan ................................ 61-215695
Oct. 21, 1987 [JP] Japan ................................ 62-263665

[51] Int. Cl.$^5$ ............................................. F16H 55/18
[52] U.S. Cl. ........................................ 74/409; 74/392; 475/12; 475/159; 475/344; 475/346
[58] Field of Search ................. 74/404, 785, 788, 810, 74/392, 801

[56] References Cited

U.S. PATENT DOCUMENTS

| | | | |
|---|---|---|---|
| 1,549,845 | 8/1925 | Münz | 74/397 |
| 2,382,846 | 8/1945 | Barber | 74/397 |
| 2,501,034 | 3/1950 | Derbyshire | 74/801 |
| 2,935,900 | 5/1960 | Rabinow et al. | 74/788 |
| 3,361,010 | 1/1968 | Miller | 74/810 |
| 3,635,103 | 1/1972 | Monti | 74/801 |
| 4,109,545 | 8/1978 | Hayasaka | 74/447 |
| 4,561,816 | 12/1985 | Dingess | 414/4 |
| 4,665,771 | 5/1987 | Mitchell | 74/788 |

FOREIGN PATENT DOCUMENTS

| | | | |
|---|---|---|---|
| 654693 | 12/1937 | Fed. Rep. of Germany | 74/801 |
| 59-50253 | 3/1984 | Japan | 74/801 |
| 115880 | 2/1946 | Sweden | 74/801 |
| 1013656 | 4/1983 | U.S.S.R. | 74/801 |

Primary Examiner—Leslie A. Braun
Assistant Examiner—Scott Anchell
Attorney, Agent, or Firm—Armstrong, Nikaido, Marmelstein, Kubovcik & Murray

[57] ABSTRACT

A controlling transmission comprising a planetary gear mechanism in which at least one pair of intermediate gears are interposed to mesh with a sun gear and an internal gear and in which intermediate shafts respectively supporting the intermediate gears are fixed on a carrier. The indexing positions for fixing the intermediate shafts on the carrier are set such that a tooth surface contacting state, in which one of the intermediate gears meshes with the sun gear and the internal gear, and another tooth surface contacting state, in which the other of the intermediate gears meshes with the sun gear and the internal gear, are determined to have opposite power transmitting directions.

5 Claims, 4 Drawing Sheets

CONTROLLING TRANSMISSION

This application is a continuation-in-part application of application Ser. No. 193,601 filed May 12, 1988, which is a divisional application of application Ser. No. 027,383, filed Mar. 18, 1987, now U.S. Pat. No. 4,759,229.

BACKGROUND OF THE INVENTION

The present invention relates to a transmission which has its rotating direction switched forward or backward during its run so that it may be used with a control apparatus such as an industrial robot.

The control apparatus such as the industrial robot is run with its rotating direction not limited to one direction but switched forward or backward as required. On the other hand, the gears of a transmission to be used with such control apparatus never fail to be accompanied by the back-lash. Because of the presence of this back-lash, there has been pointed a problem that the rotations are delayed to the extend of the back-lash, each time their direction is switched forward or backward, to make the transmission inaccurate.

In order to eliminate that inaccuracy of the transmission due to the back-lash, according to the prior art, there has been proposed a mechanism or the like, in which dual gears are superposed and shifted in phase by the back-lash so that their surfaces may come into meshing engagement with no back-lash. Despite of this proposal, however, the back-lash contains such an error as is inevitably caused by the machining. It is, therefore, extremely difficult to improve an indexing accuracy so that the two gears are fixed on their shafts with a phase shift of the back-lash having such fine error. Moreover, the two-gear superposed mechanism has failed to avoid the fatal wedge action which is caused by the two-surface meshing engagement, which in turn raises a cause for making a smooth run difficult.

SUMMARY OF THE INVENTION

An object of the present invention is to provide a controlling transmission which is free from any delay due to back-lash when the rotating direction of a power transmission is switched forward or backward.

Another object of the present invention is to provide a controlling transmission which can smoothly run without any occurrence of the aforementioned wedge action with a remarkably simple structure to switch the power transmission direction forward or backward without any delay due to back-lash.

The controlling transmission for achieving the above-specified objects according to the present invention is constructed of a planetary gear mechanism in which at least one pair of intermediate gears are interposed to mesh with a sun gear and an internal gear and in which intermediate shafts respectively supporting the intermediate gears are fixed on a carrier. The controlling transmission is characterized in that the indexing positions for fixing the intermediate shafts on the carrier are set such that a tooth surface contacting state, in which one of the intermediate gears meshes with the sun gear and the internal gear, and another tooth surface contacting state, in which the other of the intermediate gears meshes with the sun gear and the internal gear, are determined to have opposite power transmitting directions.

In the structure, preferably, rings are rotatably fitted on the outer circumference of the intermediate gears via bearings so that the intermediate gears may be rotated together with the rings through a small clearance capable of forming an oil film and supported on the outer circumferences of the rings.

DETAILED DESCRIPTION OF THE INVENTION

Figure 1:
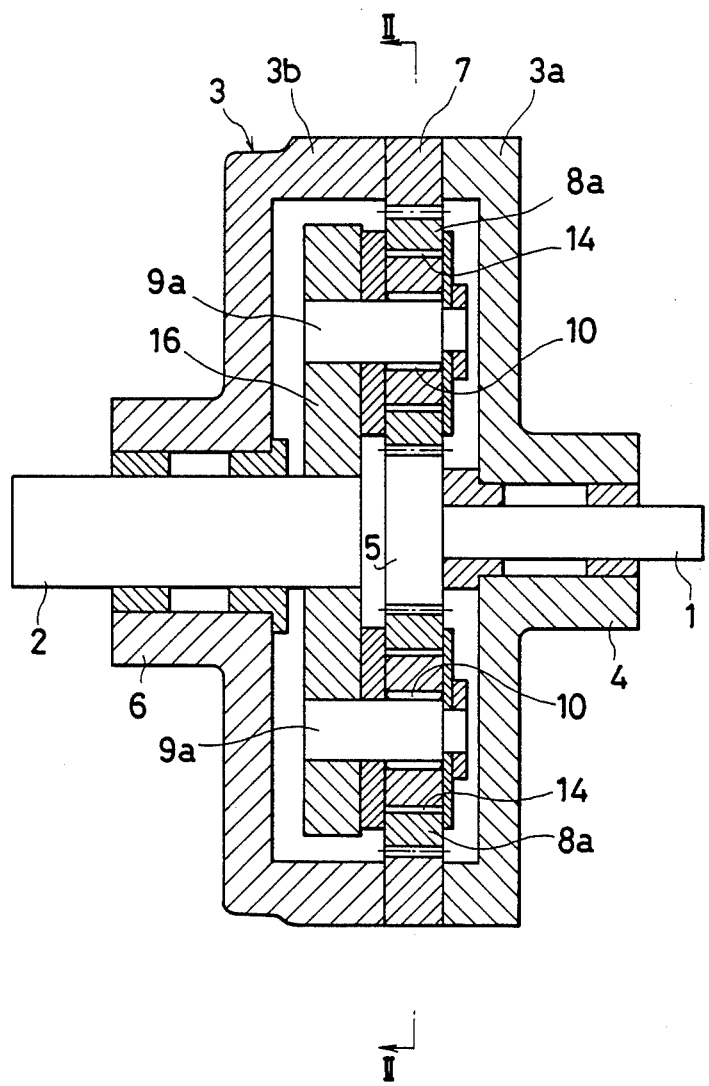
FIG. 1 a longitudinal section showing a controlling transmission according to an embodiment of the present invention.
Figure 2:
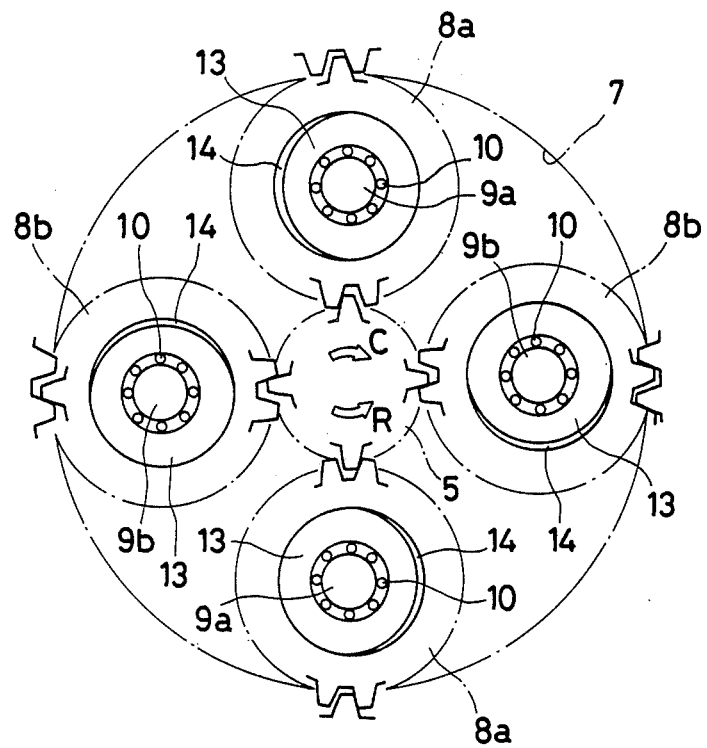
FIG. 2 is a schematic section taken along line II—II in FIG. 1 and shows the principle of the present invention.
Figure 3:
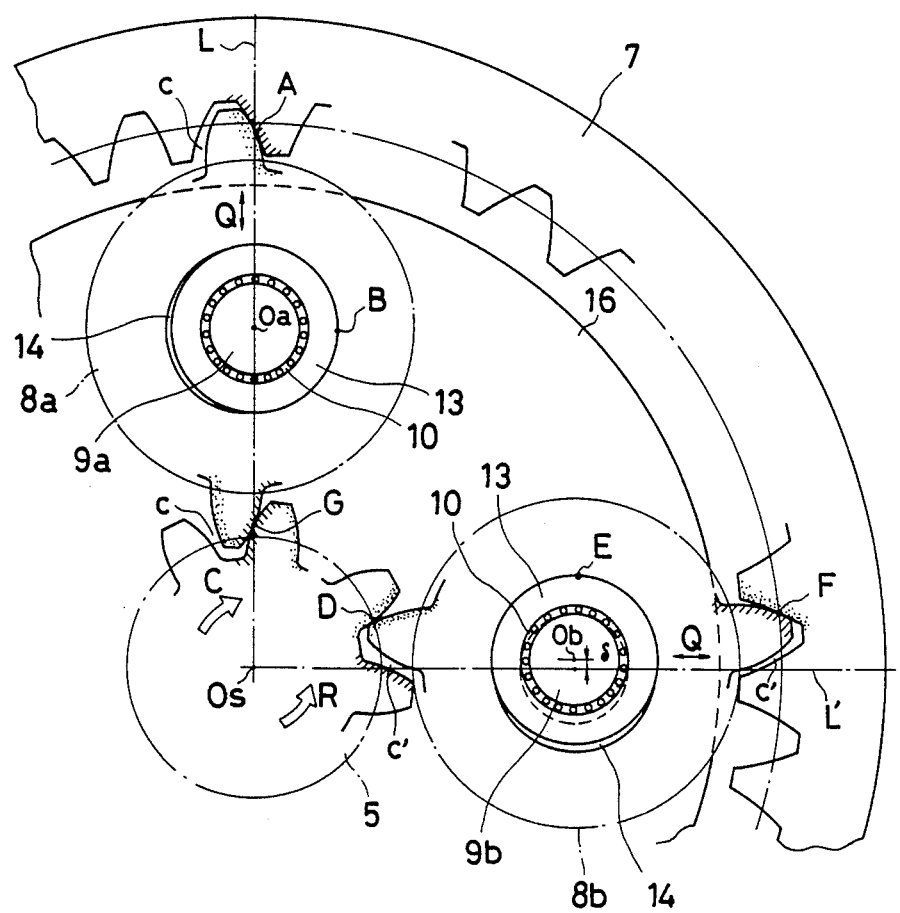
FIG. 3 is an enlarged view showing an essential portion of the same controlling transmission.

The embodiment of FIGS. 1 to 3 presents a controlling transmission which makes use of a planetary gear mechanism having two pairs of intermediate gears between a sun gear and an internal gear.

In these Figures, reference numerals 1, 2 and 3 denote an input shaft, an output shaft and a casing, respectively. In this embodiment, the casing 3 is divided into brackets 3a and 3b, between which is sandwiched an internal gear 7. The input shaft 1 is rotatably borne by a bearing 4 of the bracket 3a, and the output shaft 2 is rotatably borne by a bearing 6 of the bracket 3b. On the inner end of the input shaft 1, there is fixed a sun gear 5, between which and the internal gear 7 are interposed two pairs of intermediate gears 8a and 8a, and 8b and 8b to mesh therewith.

The aforementioned two-paired intermediate gears 8a and 8a, and 8b and 8b are rotatably borne on intermediate shafts 9a and 9a, and 9b and 9b, respectively, which are fixed on a carrier 16. The intermediate shafts 9a and 9a, and 9b and 9b support rings 13 rotatably through bearings 10, respectively, so that the intermediate gears 8a and 8a, and 8b and 8b may rotate together with the rings 13 through narrow clearances 14 capable of forming oil films. This clearance is shown in the drawing in an enlarged scale for facilitating the understanding but is in fact made so small as to optimize the formation of the oil film.

FIG. 3 shows the essential portion of the aforementioned planetary gear mechanism in an enlarged scale. Letters L and L' appearing in FIG. 3 denote two segments which are perpendicular to each other at the axis Os of the sun gear 5. The intermediate shafts 9a and 9a supporting the intermediate gears 8a and 8a have their axes Oa arranged across the axis of the sun gear 5 and on the segment L and fixed on the carrier 16. On the other hand, the intermediate shafts 9b and 9b supporting the remaining intermediate gears 8b and 8b have their axes fail to fall on the segment L' and fixed on the carrier 16 in a position which is offset by an indexed distance δ in a circumferential direction from the segment L'.

Thus, the intermediate shafts 9a and 9b are fixed in the positional relation in which the distance δ is indexed on the carrier 16. As a result, the intermediate gears 8a and 8b come into meshing engagement when the sun gear 5 rotates in the counter-clockwise direction R, and the remaining intermediate gears 8b and 8b are in meshing engagement when the sun gear 5 rotates in the opposite clockwise direction C. In other words, the intermediate gear 8a contacts at points G and A the sun gear 5 and the internal gear 7 respectively and at a point B the ring 13 with eccentricity. On the other hand, the intermediate gear 8b contacts at points D and F the sun gear 5 and the internal gear 7 respectively and at a point E the ring 13 with eccentricity.

The assembly of the gears in these meshing relations can be simply accomplished by first assembling the intermediate gears 8a into meshing engagement with the sun gear 5, as shown in FIG. 3, and then the intermediate gears 8b.

Now, if the input shaft 1 of the transmission thus set in the aforementioned meshing states is rotated in the clockwise (or forward) direction, the power is transmitted at a reduced speed through the gear train of the intermediate gears 8b to the output shaft 2. At this time, however, no power is transmitted to the output shaft 2 through the gear train of the remaining intermediate gears 8a. In this rotation of the clockwise direction C, more specifically, the meshing states of the gear train of the intermediate gears 8a establish a clearance c in the rotating direction to transmit no power so that what is conducted by the intermediate gears 8a is the follow-up rotations with their opposite gear surfaces contacting at the points A and G.

If, on the contrary, the input shaft 1 rotates in the counterclock (or backward) direction R, the power is transmitted at a reduced speed to the output shaft 2 through the gear train of the intermediate gears 8a but not through the gear train of the remaining intermediate gears 8b. In this rotation of the backward direction R, more specifically, the meshing states of the gear train of the intermediate gears 8b establish a clearance c' in the rotating direction to transmit no power so that what is conducted by the intermediate gears 8b is the follow-up rotations with the opposite gear surfaces contacting at the points D and F.

Thus, a gear train at the side of failing to transmit the power performs the follow-up rotations while maintaining the tooth surface contact. If the rotations are switched from the forward direction C to the backward direction R or vice versa, the gear train at the side of following up in the contact state performs the power transmission simultaneously with the rotational switching. As a result, rotating directions can be switched practically with no back-lash to effect the accurate transmission without any delay.

In the embodiment thus far described, moreover, the intermediate gears are supported not directly on the intermediate shafts but through the rings 13, which in turn are rotatably borne on the bearings 10, and through the small clearances 14 capable of forming oil films on the rings 13. Then, the influences from the machining errors of the gears can be reduced to make the transmission more accurate.

When, more specifically, the intermediate gears are supported not through the rings 13 but directly on the intermediate shafts, the contact points in the meshing states are limited to the points A and G in the gear train of the intermediate gears 8a and to the points D and F in the gear train of the remaining intermediate gears 8b. In this contacting structure, therefore, the rotations are sensitive to the influences from the errors of the pitches, tooth shapes and eccentricities of the gears. If, however, the rings 13 are interposed, as above, to establish the contact points B and E coming from the rolling contacts between the arcs, the intermediate gears are allowed to move a little, as indicated by arrows Q, substantially in the radial directions so that the influences on the rotations by the above-specified gear errors can be avoided.

By forming the clearances 14 capable of forming the oil films between the intermediate gears and the rings, moreover, these rings and intermediate gears are rotated together so that the Sommerfeld variable of the bearing theory is two times as high as the ordinary value. Thus, the formed oil films act more effectively in avoiding the errors.

According to the present invention, moreover, the aforementioned meshing engagements of the two pairs of intermediate gears in the opposite directions can be achieved merely by indexing the fixed positions of the intermediate shafts on the carriers so that the structure can be remarkably simplified to reduce the production cost.

Incidentally, the embodiment thus far described is exemplified by the case of providing two pairs of intermediate gears in the planetary gear mechanism. The structure of the two pairs is the most preferable for balancing the forces. However, the present invention can be practised even if one pair of intermediate gears are in meshing engagement to transmit the power in the different, i.e., forward and backward rotating directions.

Figure 4:
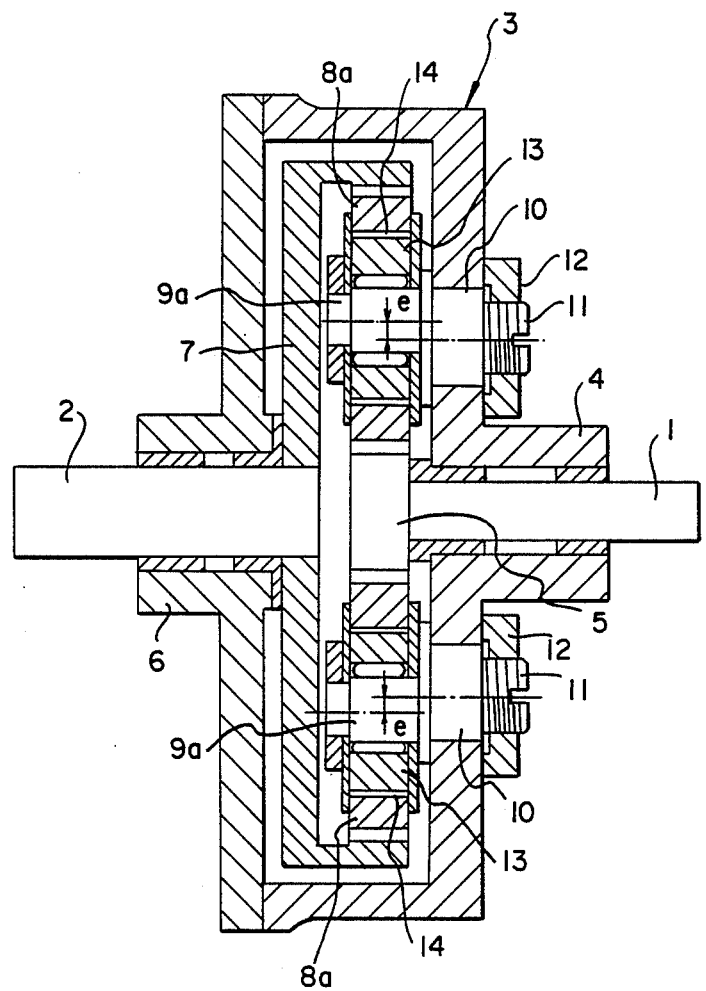
FIG. 4 is a longitudinal section similar to FIG. 1, but showing a transmission according to another embodiment of the present invention.

Moreover, the planetary gear mechanism of the aforementioned embodiment is constructed such that its internal gear is fixed in the casing whereas the carriers supporting the intermediate gears are rotated. However, the present invention can also be practised by the so-called "star type planetary gear mechanism", in which the internal gear is so borne as to rotate together with the output shaft whereas the intermediate shafts of the intermediate gears are fixed in the casing as shown in FIG. 4. The embodiment of FIG. 4 is similar to the first embodiment in that two pairs of intermediate gears 8a and 8b are interposed in the internal gear 7 and the sun gear 5, as shown in FIG. 2, but is different in that the internal gear 7 is fixed on the output shaft 2 and in that the intermediate shafts 8a and 9b of the intermediate gears 8a and 8b are fixed in the casing 3 of through the rods 10.

On the other hand, the aforementioned embodiment is exemplified by the reduction gear mechanism. However, the present invention can be applied to an overdrive mechanism, if the output shaft is used as an input shaft whereas the input shaft is used as an output shaft.

As has been described hereinbefore, according to the present invention, of at least one pair of intermediate gears of the planetary gear mechanism, one gear train of the intermediate gears is used as a power transmission side, and the other gear train of the intermediate gears is placed in the tooth surface contacting state in the opposite direction to the power transmission side so that it may perform follow-up rotations. Simultaneously with the rotating direction is switched, the other gear train of the intermediate gears transmits the power so that the power transmission can be accomplished accurately without any delay. In other words, the rotating direction can be switched with substantially no back-lash. Since, moreover, the aforementioned unique meshing state can be established merely by indexing the positions of the intermediate shafts to the carrier, so that the structure can be drastically simplified.

Where, still moreover, the intermediate gears are to be supported on the intermediate shafts, they are not supported directly on the intermediate shafts, but the rings are rotatably borne through the bearings so that the intermediate gears may rotate together with the rings through the clearances capable of forming oil films. Then, the influences upon the rotations by the working errors of the gears can be reduced to make the power transmission more accurate.

We claim:

1. A controlling transmission comprising a planetary gear mechanism having at least one pair of intermediate gears interposed to mesh with a sun gear and an internal gear, each of said intermediate gears being rotatably supported by a shaft and means fixing each of said intermediate gear shafts in a position on a carrier with the teeth of one of said intermediate gears of each pair contacting only a first face of the teeth of said sun gear and of said internal gear, and the teeth of the other intermediate gear of each pair contacting only a second face of said teeth of said sun gear and of said internal gear, wherein each of said intermediate gears in each pair contacts said sun gear and said internal gear to transmit power in opposite directions of rotation when each of said intermediate gears in each pair is driven to rotate in a direction opposite to the direction of rotation of the other intermediate gear of that pair and teeth of each of said intermediate gears constantly contact said first and second faces of said sun gear and said internal gear.

2. A controlling transmission according to claim 1, wherein rings are rotatably mounted on the outer circumferences of said intermediate shafts through bearings, and wherein said intermediate shafts through bearings, and wherein said intermediate gears are mounted on the outer circumferences of said rings with clearances between said intermediate gears and said rings wherein films of oil are formed when said intermediate gears and said rings rotate together 3. A controlling transmission according to claim 1 and including two pairs of intermediate gears in meshing engagement with said sun gear and said internal gear and each intermediate gear of each pair will transmit power in a direction opposite to the other intermediate gear of each pair.

4. A controlling transmission according to claim 1, wherein said planetary gear mechanism is constructed such that said internal gear is fixed in the casing.

5. A controlling transmission according to claim 1, wherein said planetary gear mechanism is constructed such that said internal gear is rotated together with an output shaft and such that said intermediate shafts are fixed in the casing.

* * * * *